United States Patent

Paweletz et al.

[11] Patent Number: 5,802,837
[45] Date of Patent: Sep. 8, 1998

[54] DRIVING BEARING DEVICE FOR SPINNING ROTORS OF OPEN END SPINNING MACHINES

[75] Inventors: Anton Paweletz, Fellbach; Wilhelm Birkenmaier, Weinstadt, both of Germany

[73] Assignee: SFK Textilmaschinen-Komponenten GmbH, Stuttgart, Germany

[21] Appl. No.: 811,373

[22] Filed: Mar. 4, 1997

[30] Foreign Application Priority Data

Mar. 5, 1996 [DE] Germany ............ 196 08 267.6

[51] Int. Cl.⁶ .................................................. D01H 3/00
[52] U.S. Cl. ........................ 57/406; 57/100; 384/446
[58] Field of Search ............... 57/100, 404, 406; 384/446

[56] References Cited

U.S. PATENT DOCUMENTS

| 4,022,008 | 5/1977 | Pimiskern et al. | 57/100 |
| 4,117,359 | 9/1978 | Wehde | 57/406 |
| 4,158,284 | 6/1979 | Wehde | 57/100 |
| 4,306,166 | 12/1981 | Quandt | 57/406 |
| 4,633,664 | 1/1987 | Mueller-Storz et al. | 57/100 |
| 5,535,582 | 7/1996 | Paweletz | 57/406 |
| 5,537,810 | 7/1996 | Paweletz | 57/100 |
| 5,548,950 | 8/1996 | Paweletz | 57/100 |

FOREIGN PATENT DOCUMENTS

| 4022562 | 1/1992 | Germany | 57/406 |
| 207673 C1 | 3/1993 | Germany . | |

*Primary Examiner*—William Stryjewski
*Attorney, Agent, or Firm*—Michael J. Striker

[57] ABSTRACT

An open end spinning machine has a spinning rotor, an electric motor with an axial component of a main field having a rotor and a stator, a bearing housing for the spinning rotor, the rotor of the electric motor being arranged on the spinning rotor while the stator of the electric motor being arranged in the bearing housing, and a short shaft arranged so that the spinning rotor is supported on the short shaft near its center of gravity at least in a radial direction limitedly elastically in the bearing housing and magnetically pre-tensioned in an axial direction.

16 Claims, 4 Drawing Sheets

DRIVING BEARING DEVICE FOR SPINNING ROTORS OF OPEN END SPINNING MACHINES

BACKGROUND OF THE INVENTION

The present invention relates to a driving and bearing device for spinning rotors of open end spinning machines.

More particularly, it relates to a device of the above mentioned general type which has an electric motor with an axial component of a main field, in particular an axial field motor, with a rotor arranged on a spinning rotor and a stator arranged in a bearing housing for the spinning rotor.

Driving and bearing arrangements of the above mentioned general type are known in the art, one device with an axial field rotor is disclosed for example in the German document DE 42 07 673. In the device disclosed in this reference the spinning rotor does not have a shaft and is supported in a magnet-gas bearing. In this construction problems with stability which are difficult to eliminate are present. Moreover, with the shaftless drive it is extremely difficult to drive the total band width of spinning rotors with a diameter for example from 26 mm to 65 mm with only one stator of the drive motor.

SUMMARY OF THE INVENTION

Accordingly, it is an object of present invention to provide a driving and bearing device for spinning rotors of open end spinning machines, which avoids the disadvantages of the prior art.

More particularly, it is an object of the present invention to provide a driving and bearing device for spinning rotors of open end spinning machines, which is suitable for great rotary speed region and all spinning rotor sizes and whose dynamic properties are improved over the known devices.

In keeping with these objects and with others which will become apparent hereinafter, one feature of present invention resides, briefly stated in a driving and bearing device of the above mentioned general type, in which a spinning rotor which is composed for example of a plurality of elastically connected components is supported on a short shaft near its center of gravity in a limited way at least in a radial direction, while in an axial direction it is magnetically pretensioned.

When compared to compared drives in which the spinning rotor also has a shaft, either the shaft is substantially shorter and has substantially smaller diameter. It has however a guiding function or in a horizontal arrangement of the rotor, it has also the function of receiving the gravity force of the rotor. In spinning rotors with belt-driven in direct bearing (twin-disk) the shafts must take high transverse forces and dynamic belt forces. This requires a very great dimensioning of the shaft. The same is true for motors which are driven in a single-motor way with an integral motor. Here the driving and spinning rotor are separate elements. The shaft must transfer the driving and bearing forces. Also, a relatively long construction of the shaft with a relatively great diameter is needed.

In the applicants invention the short shaft of the spinning rotor contributes to the fact that the bearing forces are very low. The incurring inertia forces are reduced by reduction of the mass of the spinning rotor. Due to an elastic bearing which is limited at least in one direction, an extremely efficient vibration damping system is produced. With the utilization of an axial field motor an extremely compact construction is obtained. In principle instead of the axial field motor also an inclined field motor can be used as well, which has both a radial and an axial component of its main field.

In accordance with a further feature of the present invention, the rotor can be composed of several elastically connected components. With high rotary speed, the rotation axes of these components automatically align with one another and coincide with the gravity center axis of the rotor. Moreover, such a construction provides for an easy exchange of the rotors.

In accordance with still a further feature of present invention, in the radial direction the shaft can be supported by a roller bearing with small inner circle of the bearing, while in the axial direction a magnetic bearing can be performed by the drive magnetic of the rotor and/or additional magnetic in the region of the shaft end.

For damping outer vibrations which act from the open end spinning machine onto the drive device, elastic connecting members can be provided between the roller bearings and the bearing housing. Preferably, in addition between the roller bearing and the stator a magnetic or an electromagnetic screening can be arranged for protection of the bearing. Also, the construction with two rows of roller bearings with an elastic gap compensation is possible.

With the elastic suspension of the total rotating system, it can happen that only one bearing row approximately receives all forces. In order to avoid this situation as well as to prevent an inclined position of the bearing rows relative to one another, an elastic gap compensation is provided which produces a definite bearing adjustment also during a heat expansion of the system.

An extremely low space consumption of the device can be obtained when the shaft is supported inside the stator winding of the motor. With such a bearing with the use of the roller bearings it is possible to provide elastic connecting members both between the radial bearings of the shaft and the stator of the motor and/or between the stator and the bearing housing. Thereby an optimal damping of all occurring inner and outer vibrations of the system is provided. An elastic suspension of both of the rotor inside the bearing housing and of the rotor shaft inside the stator is provided.

For a fast exchange of the spinning motor, for example for conversion of the machine to a new yarn type or wear of the spinning rotor, it can be supported exchangeably in the device as known in the art. For example the shaft of the spinning rotor can be elastically and removably supported in a hollow shaft connected with the rotor of the motor. During exchange of the spinning rotor of the motor and the hollow shaft remain on the driving device and the spinning rotor alone is exchanged. By the elastic support the unbalanced problems are avoided.

The spinning rotor also can be arranged releasably on the shaft and rotor of the motor. In this case the rotor of the motor and the shaft form a unit on which the rotor is releasably mounted. For this purpose the spinning rotor can be formed for example ring-shaped. Moreover, elastic connecting members can be provided between the rotor and the shaft. All rotating parts are supported limitedly elastically relative to one another. Thereby a joint rotary axis coinciding with the axis of the gravity center of the device can be formed during high rotary speeds. The elastic connection members are mechanically pre-tensioned.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENT

Figure 1:
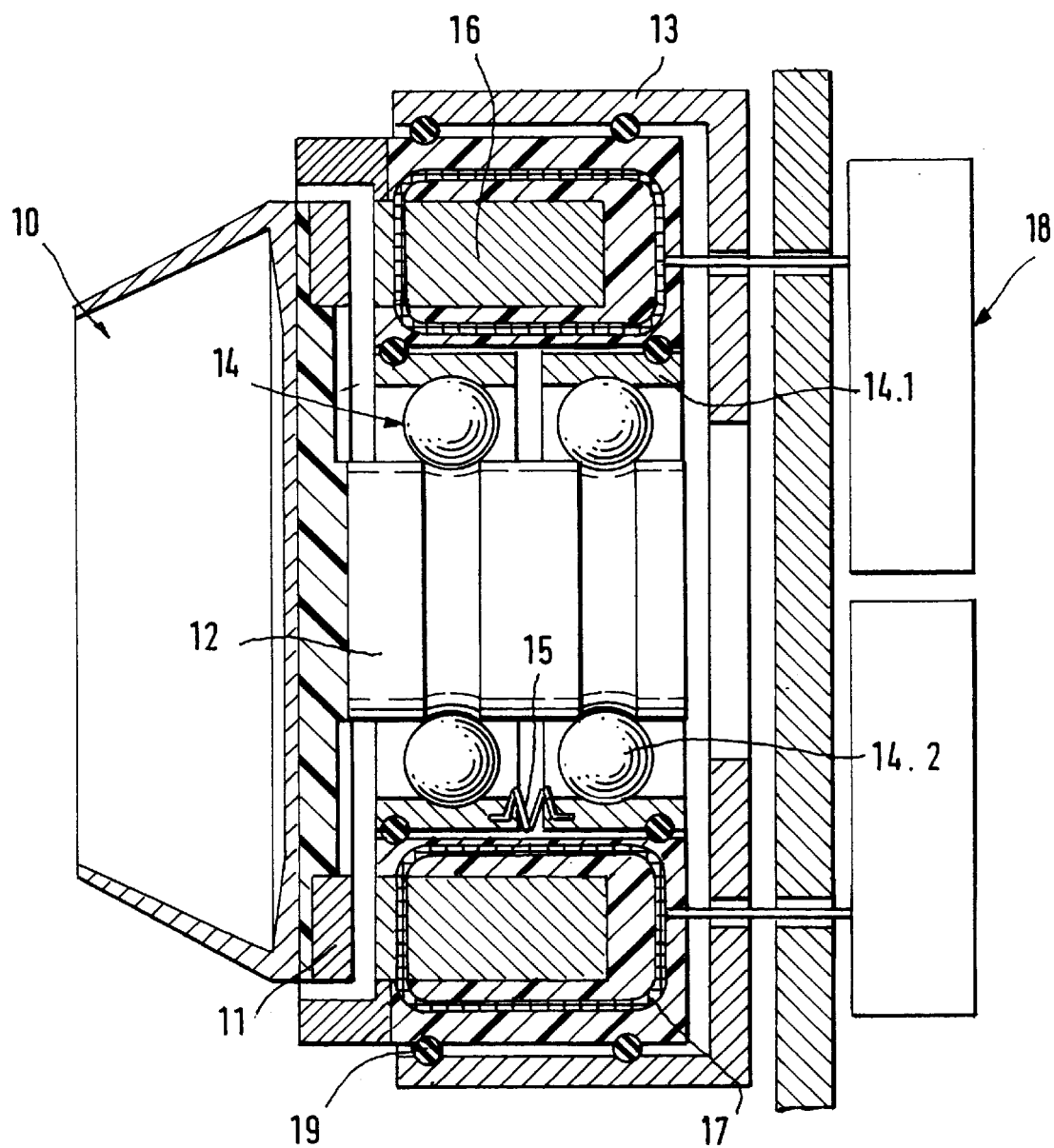
FIG. 1 is a view showing a central longitudinal section through a first embodiment of a driving and bearing device in accordance with present invention.

FIG. 1 shows a spinning rotor which is identified with reference numeral 10. A rotor 11 of an axial field motor is arranged on a rear side of the spinning rotor 10. The spinning rotor 10 is provided with a short shaft 10 which extends into a bearing housing 13. The shaft 10 in a radial direction is supported by a roller bearing 14 with two bearing rows. The both bearing rows are arranged in the bearing housing 13 elastically relative to one another in an axial direction under the action of springs 15. The roller bearing 14 as well as the shaft 12 are located inside a stator 16 of the axial field motor. The construction of the total device is thereby very compact.

The axial field motor has a gap winding 17 and is supplied from a power and cooling part 18. Elastic connecting elements 19 are provided both between the roller bearing 14 and the stator 16 as well as between the stator 16 and the housing 13. Therefore, all rotatable parts are elastically suspended in the housing 13. This guarantees an optimal damping both of the vibrations which occur inside the device as well as of the vibrations which are applied by the remaining spinning machine to the device.

The outer rings 14.1 of the roller bearing 14 can be composed preferably of a non-magnetic material. The roller bearing 14.2 is composed preferably of ceramics, and thereby a magnetic insulation between the motor and the bearing of the rotor 10 is provided. The device shown in FIG. 1 is characterized in that the rotatable mass as a whole is very small. Thereby problems with occurring unbalance because of the both rotatable masses including the rotor 11 of the motor and the spinning rotor 10 are eliminated.

Figure 2:
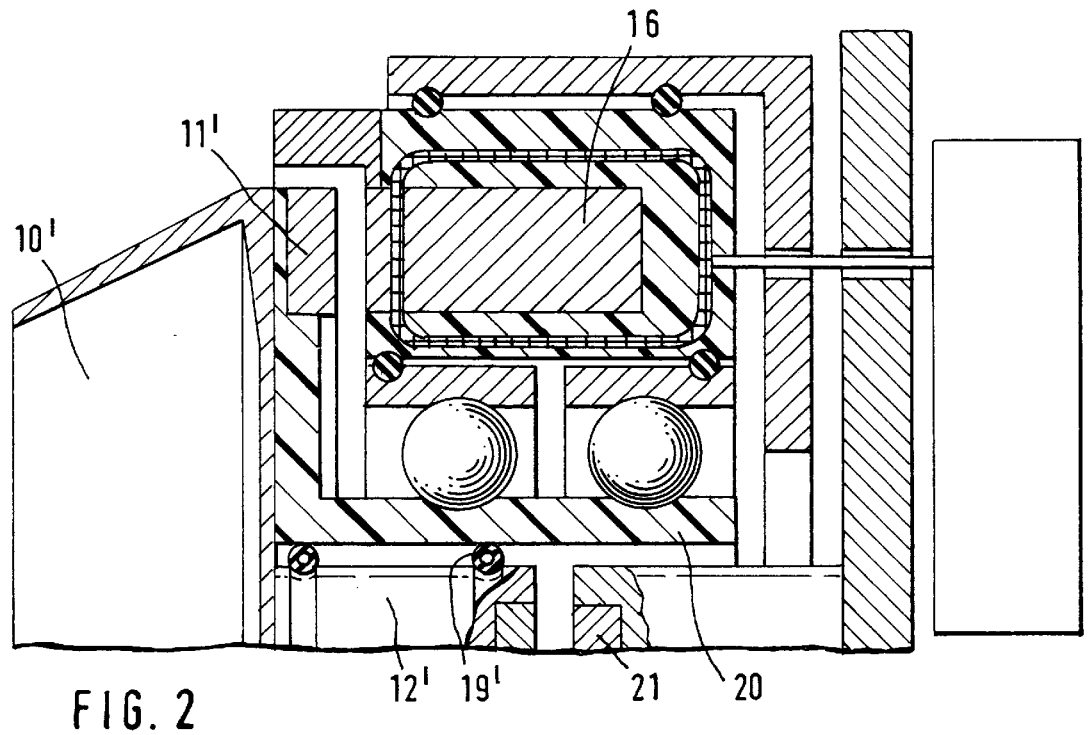
FIG. 2 is a central partial section through a second embodiment of the inventive device.
Figure 3:
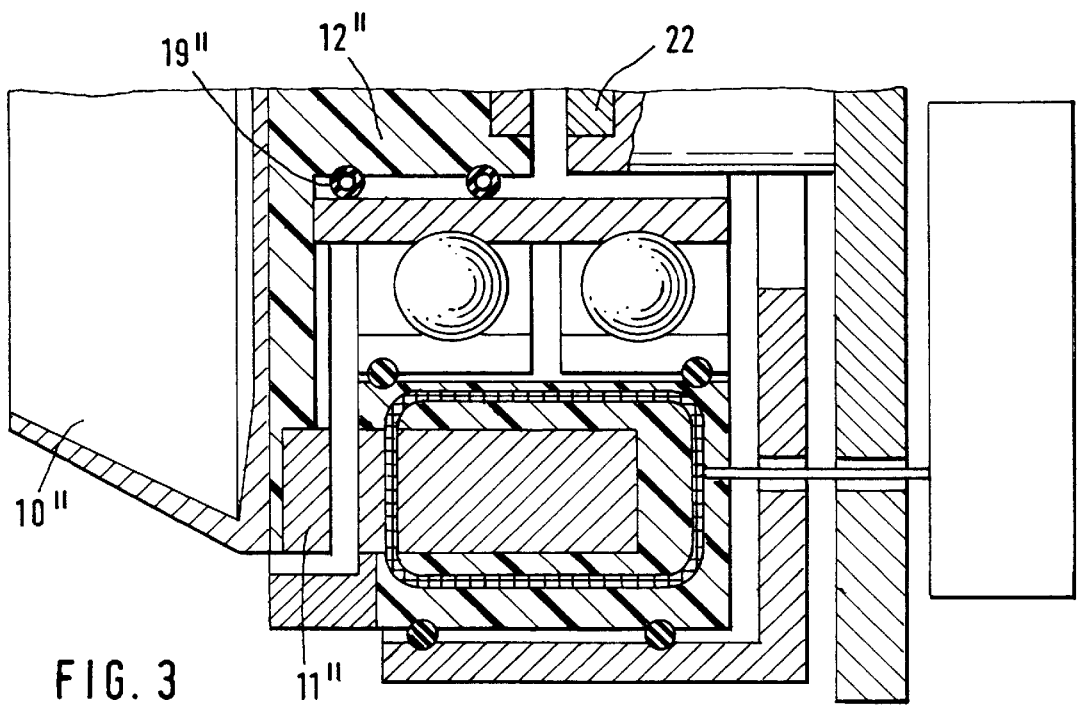
FIG. 3 is a view showing a central partial section through a third embodiment of the inventive device.

The device shown in FIG. 2 differs from the device shown in FIG. 1 in that here the spinning rotor 10' is uncoupled from the rotor 11' of the axial field motor. A magnetic or electromagnetic screening system which is preferably cylinder-symmetrical can be optionally provided between the stator 16 and the bearing system to avoid the damaging influence of the electromagnetic field on the bearings. The rotor 10' is fixedly connected with the shaft 12' which is supported inside a hollow shaft 20. The hollow shaft 20 is connected with the rotor 11' of the motor. Elastic connecting elements 19' are again arranged between the hollow shaft 20 and the rotor shaft 12'. In the axial direction, the rotor 10' is fixed by oppositely located magnets 21 arranged in the region of the lower end of the shaft 12'. The spinning rotor 10' of this device can be easily removed. Also, here the rotatable masses are extremely small and the rotation axis can be adjusted to the limited periphery of the running track of the rotor 10'. In deviation from the example shown in FIG. 2, in the device shown in FIG. 3 the rotor 10" and the rotor 11" of the motor are formed of one-part. A wear-resistant magnetic bearing 22 is provided for the axial support of the shaft 12".

Figure 4:
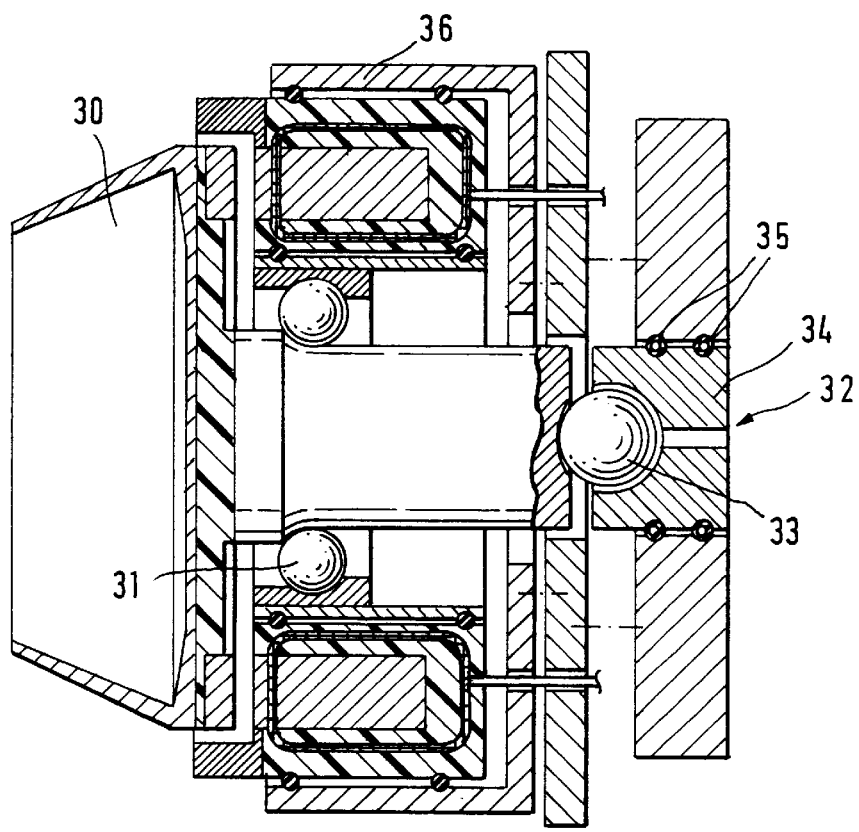
FIG. 4 is a central longitudinal section through a fourth embodiment of the inventive device.

FIG. 4 shows an embodiment with a rotor 30 which is supported in a radial direction by a single-row roller bearing 31. In the axial direction, an axial bearing 32 is provided. It is composed of a ceramic ball 33 and a receptacle 34 which is suspended on springs 35. This mechanical axial ball bearing 32 is also limitedly elastic. The required magnetic pre-tensioning of the main bearing 31 is provided by the axial field motor 36.

Figure 5:
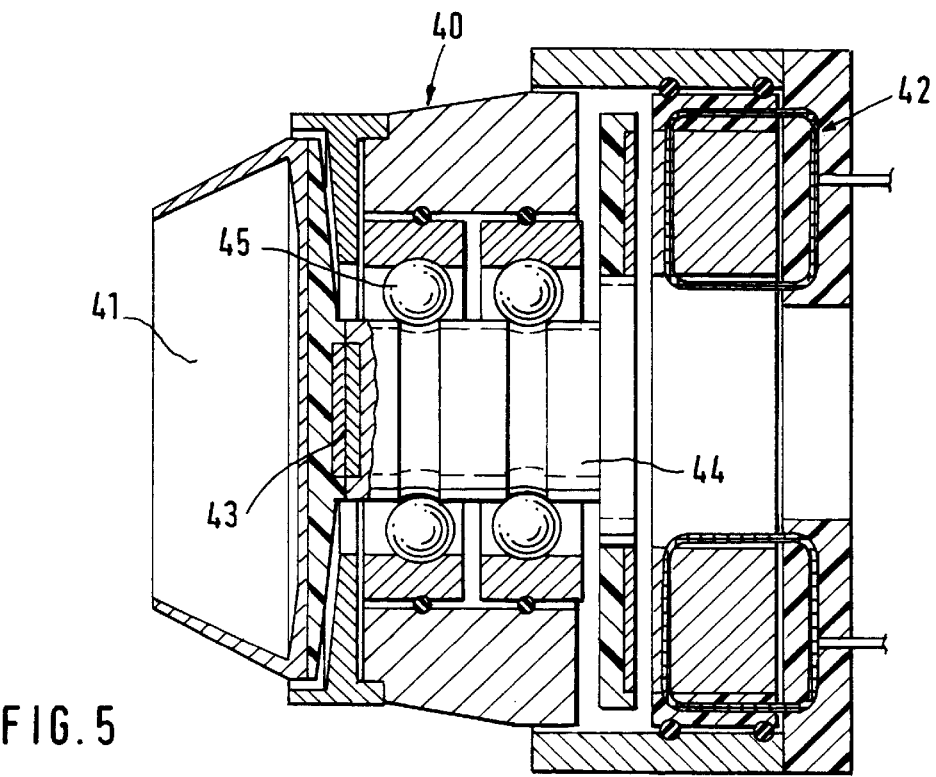
FIG. 5 is a central longitudinal portion through an embodiment of the inventive device with an exchangeable rotor.

FIG. 5 shows an embodiment variant in which the bearing 40 of the spinning rotor 41 is arranged outside of the region of the axial field motor 42. The spinning rotor 41 is connected with the shaft 44 through a magnetic lock 43 which is supported similarly to the embodiment of FIG. 1 by a two-row roller bearing 45 in the radial direction. With a spacial separation of the bearing 40 and the motor 42, instead of the axial field motor 42 also a radial field motor can be utilized. The embodiment of FIG. 5 is characterized by a favorable temperature distribution since the bearing 40 is not loaded with the heat of the motor 42. However, when compared with the embodiments of FIGS. 1–4, the rotatable masses here and thereby the problems of occurrence of unbalances are greater.

Figure 6:
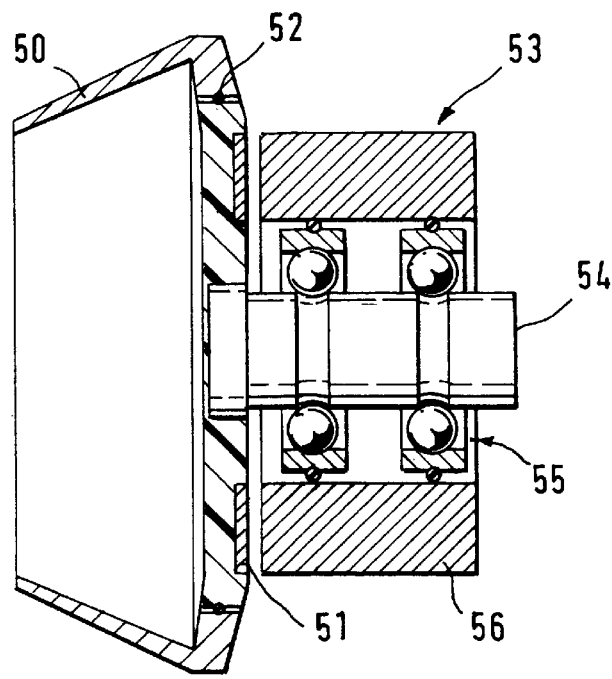
FIG. 6 is a view showing a partial section of a second embodiment with the exchangeable rotor.

FIG. 6 shows a further possibility of an exchangeable arrangement of a spinning rotor 50 in a partial section. The rotor 50 is ring-shaped and connected with a rotor 51 of an axial field motor 53 through an elastic connecting member 52. A shaft 54 is fixedly connected with the rotor 51 and moreover supported through a two-row roller bearing inside the stator 56 of a motor 53. This type of the construction of the rotor 50 constitutes an alternative to the one-part design of the rotor 10' and the shaft 12' shown in FIG. 2 with a bearing inside a hollow shaft 20.

Figure 7:
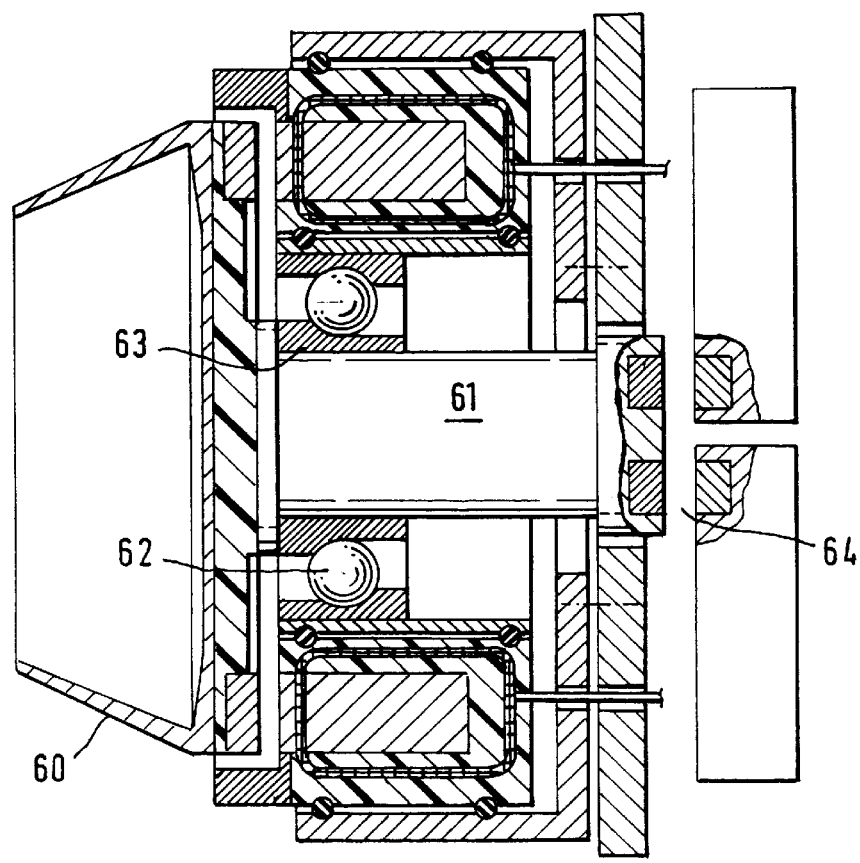
FIG. 7 is a partial view through a third embodiment with the exchangeable rotor.

FIG. 7 shows an arrangement which substantially corresponds to the arrangement of FIG. 4. A rotor 60 is supported radially by a single roller bearing row 62. The rotor 60 and the shaft 61 are designed as a one-part element. The shaft 61 is guided in the region of the roller bearing row 62 in a hollow shaft 63. A contactless magnetic bearing 64 is arranged on the shaft end. The rotor 60 of this arrangement is also easily exchangeable.

It will be understood that each of the elements described above, or two or more together, may also find a useful application in other types of constructions differing from the types described above.

While the invention has been illustrated and described as embodied in driving bearing device for spinning rotors of open end spinning machines, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

We claim:

1. An open end spinning machine, comprising a spinning rotor; an electric motor having a main field with an axial component, and having a rotor and a stator; a bearing housing with a bearing for said spinning rotor; said rotor of said electric motor being arranged on said spinning rotor while said stator of said electric motor being arranged in said bearing housing; and a short shaft supported by said bearing, said spinning rotor being supported on said short shaft near a center of gravity of said spinning rotor, said spinning rotor being supported limitedly elastically at least in a radial direction in said bearing housing and being magnetically pre-tensioned in an axial direction, said spinning rotor being composed of a plurality of components which are elastically connected with one another.

2. An open end spinning machine as defined in claim 1; wherein said bearing is a roller bearing said shaft being supported in a radial direction by said roller bearing.

3. An open end spinning machine as defined in claim 2; and further comprising an elastic connecting member arranged between said roller bearing and said stator.

4. An open end spinning machine as defined in claim 3; and further comprising an elastic connecting member arranged between said roller bearing and said stator.

5. An open end spinning machine as defined in claim 4; and further comprising an elastic connecting member arranged between said stator and said bearing housing.

6. An open end spinning machine as defined in claim 1, wherein said electric motor has a driving magnet said shaft being magnetically pre-tensioned by said driving magnet of said motor.

7. An open end spinning machine as defined in claim 6; wherein said electric motor has also an additional magnet, said shaft being magnetically pre-tensioned by said additional magnet.

8. An open end spinning machine as defined in claim 7; and further comprising a magnetic screening provided between said roller bearing and said stator.

9. An open end spinning machine as defined in claim 7; and further comprising an electromagnetic screening provided between said roller bearing and said stator.

10. An open end spinning machine as defined in claim 1, wherein said electric motor has a driving magnet and an additional magnet said shaft being magnetically pre-tensioned by said additional magnet.

11. An open end spinning machine as defined in claim 1; wherein said bearing comprises two rows of roller bodies, said shaft being supported by said two rows of said roller bodies.

12. An open end spinning machine as defined in claim 1, wherein said stator of said electric motor has a stator winding, said shaft being supported inside said stator winding of said electric motor.

13. An open end spinning machine as defined in claim 1; and further comprising an elastic connecting member arranged between said stator and said bearing housing.

14. An open end spinning machine as defined in claim 1; and further comprising a hollow shaft connected with said rotor, said short shaft being elastically and removably supported in said hollow shaft.

15. An open end spinning machine as defined in claim 1, wherein said spinning rotor is releasably arranged on said shaft and said rotor of said electric motor.

16. An open end spinning machine as defined in claim 1; and further comprising the connecting member provided between said rotor of said electric motor and said shaft.

* * * * *